US009834268B2

(12) United States Patent
Tanabe et al.

(10) Patent No.: US 9,834,268 B2
(45) Date of Patent: Dec. 5, 2017

(54) SADDLE-RIDE TYPE VEHICLE

(71) Applicant: HONDA MOTOR CO., LTD., Tokyo (JP)

(72) Inventors: Gen Tanabe, Wako (JP); Satoshi Seo, Wako (JP); Akihiro Komatsu, Wako (JP); Takefumi Okubo, Wako (JP); Masao Akieda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/941,116

(22) Filed: Nov. 13, 2015

(65) Prior Publication Data

US 2016/0244117 A1    Aug. 25, 2016

(30) Foreign Application Priority Data

Sep. 30, 2014 (JP) .................................. 2014-202150

(51) Int. Cl.
| | |
|---|---|
| *B62J 17/04* | (2006.01) |
| *B62K 19/00* | (2006.01) |
| *B62K 21/12* | (2006.01) |
| *B62K 25/00* | (2006.01) |

(52) U.S. Cl.
CPC ............. *B62J 17/04* (2013.01); *B62K 19/00* (2013.01); *B62K 21/12* (2013.01); *B62K 25/005* (2013.01)

(58) Field of Classification Search
CPC ........................................................ B62J 17/04
USPC ................................................. 296/192, 78.1
See application file for complete search history.

(56) References Cited

U.S. PATENT DOCUMENTS

| | | | | |
|---|---|---|---|---|
| 4,911,494 A | * | 3/1990 | Imai ......................... | B62J 17/00 296/180.1 |
| 7,878,571 B2 | * | 2/2011 | Misaki ..................... | B62J 17/04 296/180.5 |
| 8,454,075 B2 | * | 6/2013 | Hayashi .................... | B62J 17/02 296/78.1 |
| 8,950,799 B2 | * | 2/2015 | Yokouchi ................. | B62J 17/06 296/180.1 |

(Continued)

FOREIGN PATENT DOCUMENTS

| | | | | |
|---|---|---|---|---|
| EP | 0644107 A1 | * | 3/1995 | .............. B62J 17/00 |
| EP | 1063153 A2 | * | 12/2000 | ................ B62J 1/12 |

(Continued)

*Primary Examiner* — H Gutman
(74) *Attorney, Agent, or Firm* — Birch, Stewart, Kolasch & Birch, LLP

(57) ABSTRACT

A saddle-ride type vehicle is capable of achieving miniaturization of a front cowl while ensuring a flow rate of air introduction. An opening penetrating through a longitudinal direction of a vehicle is formed below the center in a height direction of a vertically long windshield. First traveling air is passed through the opening formed in the windshield. A direction of the first traveling air is then changed by a guide member, and is moved upward along a back surface of the windshield. Excessive vacuum on the back surface of the windshield is corrected. Since an opening is formed in the windshield, it is not necessary to increase a width of the front cowl, and miniaturization of the front cowl can be achieved. Since the windshield is formed as a vertically long windshield, the opening can be formed to be vertically long, and an opening area can be ensured.

12 Claims, 6 Drawing Sheets

(56) References Cited

U.S. PATENT DOCUMENTS

| | | | | |
|---|---|---|---|---|
| 9,010,835 | B2* | 4/2015 | Tsukui | B62J 17/04 296/78.1 |
| 9,283,830 | B2* | 3/2016 | Takahashi | B62J 17/04 |
| 9,334,005 | B2* | 5/2016 | Horiuchi | B62J 23/00 |
| 2008/0185865 | A1* | 8/2008 | Matsuo | B62J 17/04 296/78.1 |
| 2009/0189413 | A1* | 7/2009 | Misaki | B62J 17/04 296/180.1 |
| 2014/0091596 | A1* | 4/2014 | Maeda | B62D 25/081 296/192 |
| 2014/0159426 | A1* | 6/2014 | Takahashi | B62J 17/04 296/192 |
| 2014/0203594 | A1* | 7/2014 | Tsukui | B62J 17/04 296/192 |
| 2016/0288855 | A1* | 10/2016 | Ueno | B62J 6/02 |

FOREIGN PATENT DOCUMENTS

| | | | | | |
|---|---|---|---|---|---|
| EP | 1081032 | A2 | * | 3/2001 | ............ B62J 17/04 |
| EP | 1457412 | A2 | * | 9/2004 | ............ B62J 17/04 |
| EP | 1495954 | A2 | * | 1/2005 | ............ B62J 17/04 |
| EP | 1803633 | A1 | * | 7/2007 | ............ B62J 17/04 |
| EP | 2082951 | A2 | * | 7/2009 | ............ B62J 17/04 |
| EP | 2168856 | A2 | * | 3/2010 | ............ B62J 17/02 |
| EP | 2192033 | A1 | * | 6/2010 | ............ B62J 17/04 |
| EP | 3002188 | A1 | * | 4/2016 | ............ B62J 17/02 |
| EP | 3002190 | A1 | * | 4/2016 | ............ B62J 17/04 |
| EP | 3059149 | A1 | * | 8/2016 | ............ B62J 17/02 |
| JP | 3807218 | B2 | * | 8/2006 | ............ B62J 17/04 |
| JP | 4153174 | B2 | | 9/2008 | |
| JP | 2016150707 | A | * | 8/2016 | ........... B62J 177/02 |
| WO | WO 2009041155 | A1 | * | 4/2009 | ............ B62J 17/04 |

* cited by examiner

SADDLE-RIDE TYPE VEHICLE

CROSS-REFERENCE TO RELATED APPLICATIONS

The present application claims priority under 35 U.S.C. §119(a) to Japanese Patent Application No. 2014-202150, filed on Sep. 30, 2014, the entire contents of which are hereby incorporated by reference.

BACKGROUND OF THE PRESENT INVENTION

1. Field of the Invention

The present invention relates to a saddle-ride type vehicle having an improved front structure.

2. Description of Background Art

A saddle-ride type vehicle configured such that a vehicle body is covered with a cowl is known in the background art. Travelling performance can be improved by achieving a smooth flow of traveling air by the cowl. The cowl for covering a front part of a vehicle body is called a front cowl. Various kinds of shapes or structures of a front cowl have been proposed (for example, see JP 4153174-B2.

A vehicle (10) (a number in parentheses is indicative of a reference sign described in JP 4153174-B2. The same shall apply hereafter.) shown in FIG. 1 of JP 4153174-B2 includes a front cowl (21). The front cowl (21) has an air introduction port (32a) formed in an upper part of a center thereof.

As shown in FIG. 15 of JP Patent No. 4153174, air (Fw) flowing from the air introduction port (32a) flows along a back surface of a windshield (31), as shown by an arrow (Rw). Vacuum on the back surface of the windshield (31) can be corrected by a flow shown by the arrow (Rw).

An increase in an opening area of the air introduction port (32a) and an increase in a flow rate of air introduction are effective to reinforce vacuum correction, if necessary.

As can be seen in FIG. 1 of JP 4153174-B2, when the air introduction port (32a) is enlarged, it is necessary to increase a width of the front cowl (21) to maintain rigidity of the front cowl (21). As a result, the front cowl (21) is enlarged, and a weight of the front cowl is increased. Since miniaturization and weight reduction of the vehicle are required, the enlargement and an increase in weight of the front cowl are undesirable.

Therefore, a saddle-ride type vehicle is required, the saddle-ride type vehicle being capable of achieving the miniaturization of the front cowl, while ensuring the flow rate of air introduction.

SUMMARY OF THE INVENTION

An object of the present invention is to provide a saddle-ride type vehicle that is capable of achieving miniaturization of a front cowl, while ensuring a flow rate of air introduction.

According to a first aspect of the present invention, there is provided a saddle-ride type vehicle including: a vehicle body frame having a head pipe; a front wheel suspension arranged below the head pipe; a handlebar arranged above the head pipe and configured to steer the front wheel suspension; a front cowl supported on the vehicle body frame and covering an upper part of the front wheel suspension and the handlebar from a front side of the vehicle; and a windshield supported on the vehicle body frame through a windshield stay and arranged above the front cowl. In the saddle-ride type vehicle, the windshield is formed as a vertically long windshield with a vertical dimension of the windshield being larger than a dimension of the windshield in a vehicle width direction, and the windshield having an opening opened below a center of the windshield in a height direction of the vertically long windshield and penetrating through a longitudinal direction of the vehicle, and wherein a guide member is configured to allow first traveling air from the opening to flow along a back surface of the windshield, the guide member being arranged behind the opening.

According to a second aspect of the present invention, the windshield stay is provided with right and left side guide surfaces for sandwiching the guide member and suppressing dispersion of the first traveling air in the vehicle width direction.

According to a third aspect of the present invention, the windshield is obliquely attached in such a manner that an upper part thereof is positioned rearward of the vehicle in comparison with a lower part thereof in a side view of the vehicle, and a mounting angle with respect to a horizontal line is set within a range of 45° to 80°.

According to a fourth aspect of the present invention, the windshield has right and left notches formed on right and left sides of the opening, the notches being formed such a manner that the lower part of the windshield is recessed inward in the vehicle width direction in comparison with the center in the height direction, the front cowl is provided with inner wall guide surfaces extending rearward of the vehicle and also keeping predetermined intervals from the notches, and second traveling air is introduced between the notches and the inner wall guide surfaces.

According to a fifth aspect of the present invention, the notches have inclined edges provided above the notches and inclined in order to be heightened outward in the vehicle width direction, the front cowl has inclined pieces in positions behind the inclined edges, the inclined pieces being bent rearward of the vehicle along ridge lines substantially parallel to the inclined edges, and third traveling air flowing along the inclined edges is directed to the center of vehicle width by the inclined pieces.

According to the first aspect of the present invention, since the opening is formed in the windshield, not the front cowl, it is unnecessary to increase the width of the front cowl. Therefore, the front cowl can be miniaturized. Also, since the windshield is formed as a vertically long windshield, the opening can be formed to be vertically long, and the opening area can be ensured. The first traveling air is directed to flow along the back surface of the windshield by the guide member. Thereby, generation of vacuum on the back surface of the windshield is suppressed.

In view of the above, the present invention provides a saddle-ride type vehicle that is capable of achieving miniaturization of the front cowl, while ensuring the flow rate of air introduction (first traveling air).

According to the second aspect of the present invention, the first traveling air is guided by the right and left guide surfaces arranged behind the opening, and is suppressed from being dispersed in the vehicle width direction. Therefore, the first traveling air can flow along the back surface of the windshield efficiently. Since the right and left guide surfaces are provided, effective air introduction is increased, so that the opening area can be also reduced.

According to the third aspect of the present invention, the windshield is obliquely attached in such a manner that the upper part thereof is positioned rearward of the vehicle in comparison with the lower part thereof in the side view of the vehicle, and the mounting angle with respect to the horizontal line is set within the range of 45° to 80°. Since the windshield is attached upright, predetermined windbreak action can be exerted even by a compact windshield. Since the windshield is compact, a reduction in weight of the windshield can be achieved.

According to the fourth aspect of the present invention, the windshield has right and left notches formed on the right and left sides of the opening, the front cowl is provided with the inner wall guide surfaces extending rearward of the vehicle and also keeping the predetermined intervals from the notches, and the second traveling air is introduced between the notches and the inner wall guide surfaces. Since the second traveling air is guided by the inner wall guide surfaces extending in the longitudinal direction of the vehicle, the second traveling air is directed rearward of the vehicle without being bent in the vehicle width direction. As a result, the possibility of entrainment of the second traveling air into the back surface of the windshield is precluded.

According to the fifth aspect of the present invention, the notches have inclined edges provided above the notches and inclined in order to be heightened outward in the vehicle width direction, and the front cowl has inclined pieces in positions behind the inclined edges, the inclined pieces being bent rearward of the vehicle along the ridge lines substantially parallel to the inclined edges. The third traveling air flowing along the inclined edges is directed to the center of the vehicle width by the inclined pieces. Even if some of the first traveling air is intended to escape in the vehicle width direction, an escape of the first traveling air therein is suppressed by the third traveling air.

The first traveling air and the third traveling air are mixed with each other, so that excessive vacuum on the back surface of the windshield is corrected.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
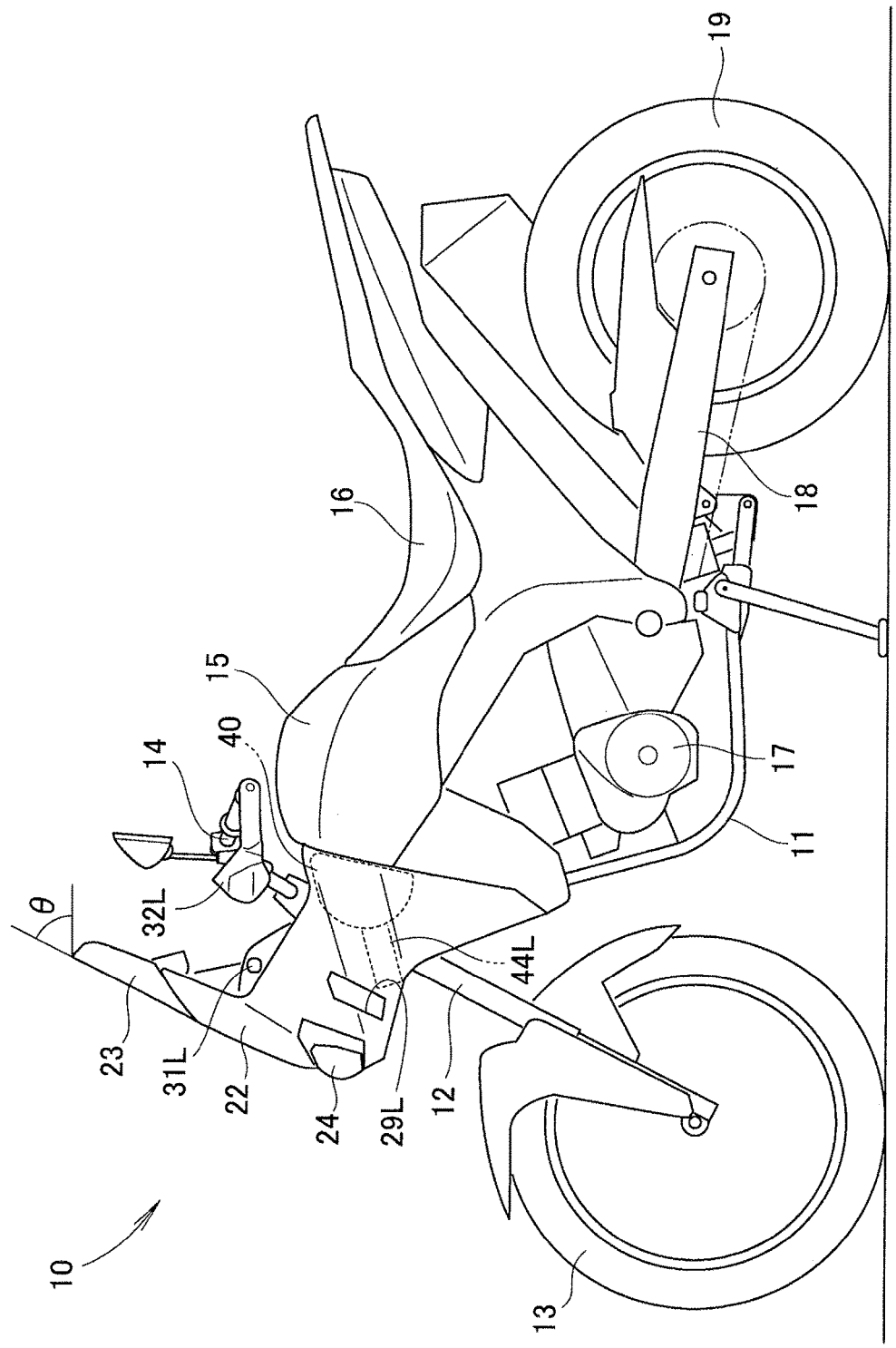
FIG. 1 is a left side view of a saddle-ride type vehicle according to the present invention.

An embodiment of the present invention will be described below based on the accompanying drawings, wherein the same reference numerals have been used to identify the same or similar elements throughout the several views. It should be noted that the drawings should be viewed in the direction of orientation of the reference numerals.

As shown in FIG. 1, a saddle-ride type vehicle 10 includes front wheel suspensions 12 steerably mounted in front of a vehicle body frame 11. A front wheel 13 is rotatably attached to lower parts of the front wheel suspensions 12. A steering handlebar 14 is mounted to upper parts of the front wheel suspensions 12. A fuel tank 15 is arranged below the handlebar 14 and is supported on the vehicle body frame 11. A seat 16 is arranged behind the fuel tank 15. An engine 17 is arranged below the fuel tank 15 and is supported on the vehicle body frame 11. A swing arm 18 extends rearward from the vehicle body frame 11. A rear wheel 19 is rotatably attached to the swing arm 18. Front cowls 22 are arranged in front of the fuel tank 15, so as to surround the front wheel suspensions 12. A windshield 23 is mounted above the front cowls 22. Headlights 24 are mounted to the front parts of the front cowls 22. The saddle-ride type vehicle 10 is a vehicle configured such that an upper part of a rider's body is kept up while striding over the seat 16.

The windshield 23 is obliquely mounted so that in a side view of the vehicle, an upper part of the windshield is positioned rearward of the vehicle with respect to a lower part of the windshield. A mounting angle θ with respect to a horizontal line is set within a range of 45° to 80°.

Since the mounting angle θ is set to 45° or larger, windbreak performance can be improved, while achieving a reduction in weight of the windshield 23 by shortening a longitudinal length of the windshield 23. Also, since the mounting angle θ is set to 80° or smaller, the traveling air is suppressed from being excessively stemmed by the windshield 23. Therefore, the mounting angle θ is set to 45° to 80°, and more preferably set to about 60°.

Since the windshield 23 is mounted upright, a predetermined windbreak action can be exerted even by a compact windshield. Since the windshield is compact, a reduction in weight of the windshield can be achieved.

Figure 2:
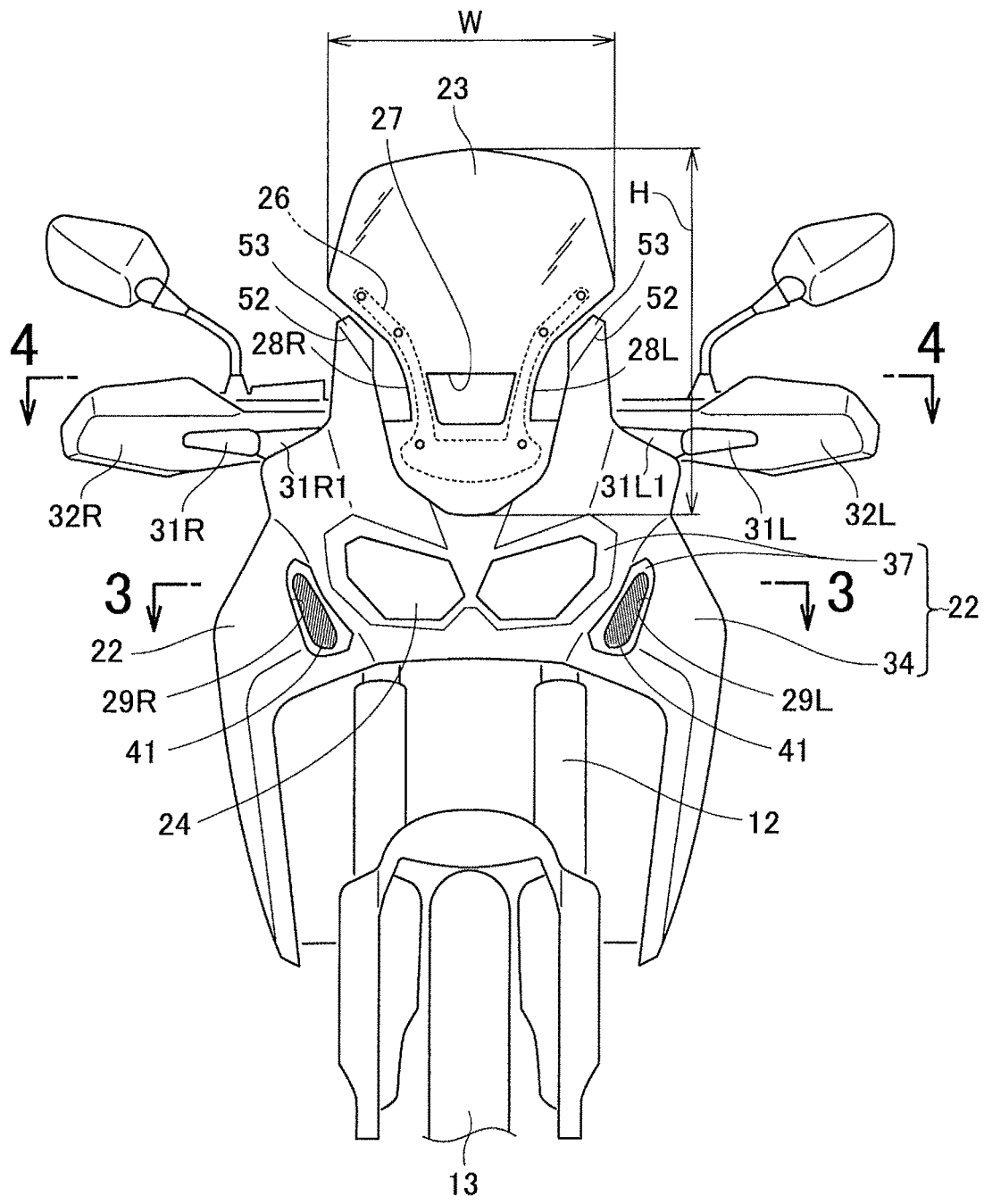
FIG. 2 is a front view of the saddle-ride type vehicle of FIG. 1.

As shown in FIG. 2, the windshield 23 is arranged above the front cowls 22. The windshield 23 is supported by a windshield stay 26. The windshield 23 is formed as a vertically long windshield with a vertical dimension H being larger than a dimension W in the vehicle width direction, and has an opening 27 formed below the center in a height direction of the vertically long windshield and penetrating through a front part and a rear part of the vehicle (a front direction and a rear direction in the drawing). Further, the windshield 23 has right and left notches 28R, 28L (a reference sign R is indicative of a suffix showing the right, and a reference sign L is indicative of a suffix showing the left. The same shall apply hereafter.) formed on the right side and the left side of the opening 27 so that a lower part of the windshield is recessed inward in the vehicle width direction with respect to the center in the height direction.

The front cowls 22 are provided with the headlights 24 in the center in the vehicle width direction. Introduction ports 29R, 29L composed of openings opened forward are provided respectively on a right side and a left side of the headlights 24. Right and left turn signal lamps 31R, 31L and strut parts 31R1, 31L1 for supporting the turn signal lamps 31R, 31L are provided above the headlights 24.

In the front view of the vehicle, the turn signal lamps 31R, 31L or the strut parts 31R1, 31L1 overlap with knuckle guards 32R, 32L located behind the turn signal lamps 31R, 31L or the strut parts 31R1, 31L1.

As shown in FIG. 1, the introduction ports 29R, 29L are arranged below the handlebar 14, and as shown in FIG. 2, the introduction ports 29R, 29L are arranged outside in the vehicle width direction of the front wheel suspensions 12.

Figure 3:
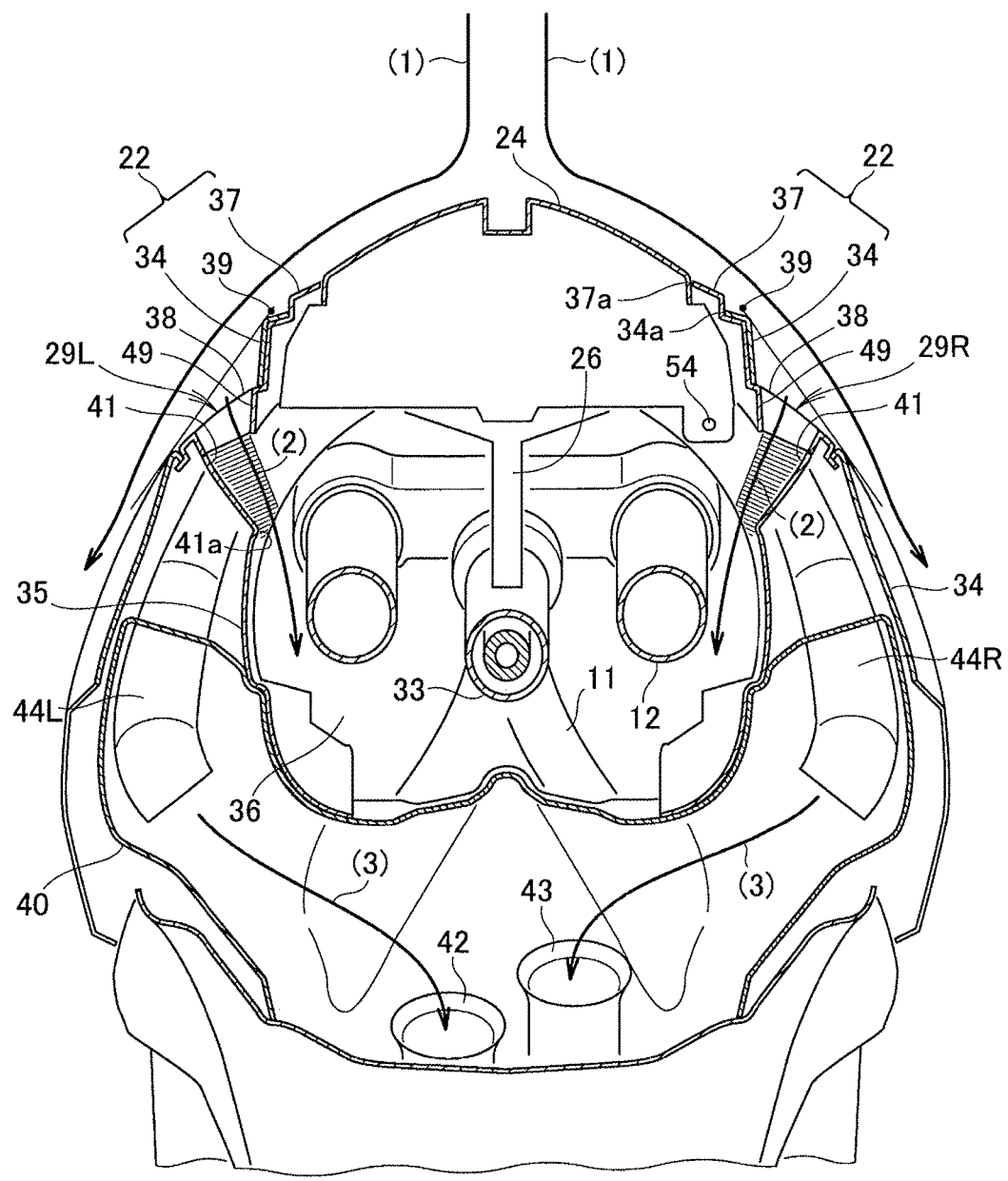
FIG. 3 is a cross-sectional view taken along line 3-3 in FIG. 2.

As shown in FIG. 3, the front cowls 22 are configured in such a manner that middle members 34 are joined to front sides of front members 37. The front members 37 are formed with air introduction passage parts 49, 49 extending to be continuous with rear sides of the introduction ports 29R, 29L formed in the middle members 34.

The windshield stay 26 extends forward of the vehicle from the head pipe 33 provided to a front part of the vehicle body frame 11. Also, the front wheel suspensions 12 are steerably mounted to the head pipe 33. The inner cowl 35 is arranged inside of the middle members 34. The inner cowl 35 forms a steering space 36 for allowing steering of the front wheel suspensions 12, while surrounding the head pipe 33 and the front wheel suspensions 12.

The headlights 24 are provided with LED light sources, and are exposed forward from headlight cowl parts 37a provided with headlight openings formed in the front members 37. Openings 34a are formed in the middle members 34 along the peripheries of the headlight cowl parts 37a of the front members 37.

Also, the front members 37 are formed integrally with a guide member (a reference sign 46 in FIG. 4) arranged on the back surface of the windshield 23.

In positions of the front members 37 on an outer side in the vehicle width direction, recessed parts 38, 38 recessed rearward of the vehicle are formed in the middle members 34, and the introduction ports 29R, 29L are formed in the recessed parts 38, 38. It should be noted that the recessed parts 38 are recessed rearward of the vehicle with respect to tangents 39 brought into contact with the headlight cowl parts 37a and outer sides in the vehicle width direction of the recessed parts formed in the middle members 34.

During turning, the traveling air flowing along the headlights 24 is led to smoothly flow along the tangents 39 as shown by arrows (1), (1). On the other hand, during straight-ahead traveling, the traveling air from the front side of the vehicle is directed to flow directly into the introduction ports 29R, 29L as shown by arrows (2), (2).

Since the recessed parts 38, 38 are formed, the traveling air flows as shown by the arrows (1), (1) during turning. Therefore, even if a bank angle is changed when the vehicle is banked during turning, resistance caused by the traveling air flowing along the front surface of the front cowl can be substantially kept constant. As a result, traveling performance can be excellently maintained.

In the embodiment, guide walls 41, 41 inclined inward and upward are connected to the introduction ports 29R, 29L. The traveling air can be directed to flow upward and to the center of the vehicle body by the guide walls 41, 41. The guide walls 41, 41 configured in this way are formed integrally with the inner cowl 35.

An inner end 41a of the guide wall 41 extends to the same extent as an edge 29a inside in the vehicle width direction of the introduction port 29L or to a side of the center of the vehicle body. As a result, in FIG. 2, the guide walls 41, 41 are brought into view from the introduction ports 29R, 29L. That is, since the inside (wiring or an air intake duct 44 exists in the inside) is not brought into view through the introduction ports 29R, 29L, the quality of the appearance can be improved.

In FIG. 3, an air cleaner case 40 is arranged behind the head pipe 33 in the vehicle, and inlet ports 42, 43 for the engine 17 are arranged in the air cleaner case 40. Air intake ducts 44R, 44L are arranged between the inner cowl 35 and the middle members 34 of the front cowls 22, and some of the traveling air is introduced from below the front cowls 22 into the air cleaner case 40 through the air intake ducts 44R, 44L and is introduced to the inlet ports 42, 43 as shown by arrows (3), (3).

Also, the traveling air as shown by the arrows (2), (2) reaches the steering space 36. The steering space 36 is configured such that at least an upper surface thereof is opened, and the traveling air (as shown by the arrows (2), (2)) is directed to flow upward (to a front side in the drawing) behind the front cowls 22 and in front of an occupant. More specifically, the traveling air (as shown by the arrows (2), (2)) is directed to flow upward behind the front cowls 22 and in front of the fuel tank 15, that is, in front of the handlebar 14.

Introduction of the traveling air flowing outside in the vehicle width direction of the front cowls and the windshield, to the inner side in the vehicle width direction by the vacuum generated behind the front cowls and behind the windshield, can be suppressed by the air introduction flowing outside of a front fork in the steering space.

It should be noted that the intake ducts 44R, 44L are allowed to be eliminated and an intake passage for introducing intake air for the engine is allowed to be provided or formed between the inner cowl 35 and the middle members 34. Also, an outside temperature sensor 54 is supported behind the headlights 24, and a temperature of the traveling air flowing through the air introduction passage parts is measured. Thereby, since fresh air is normally introduced, temperature sensing accuracy of the outside air temperature can be improved.

Figure 4:
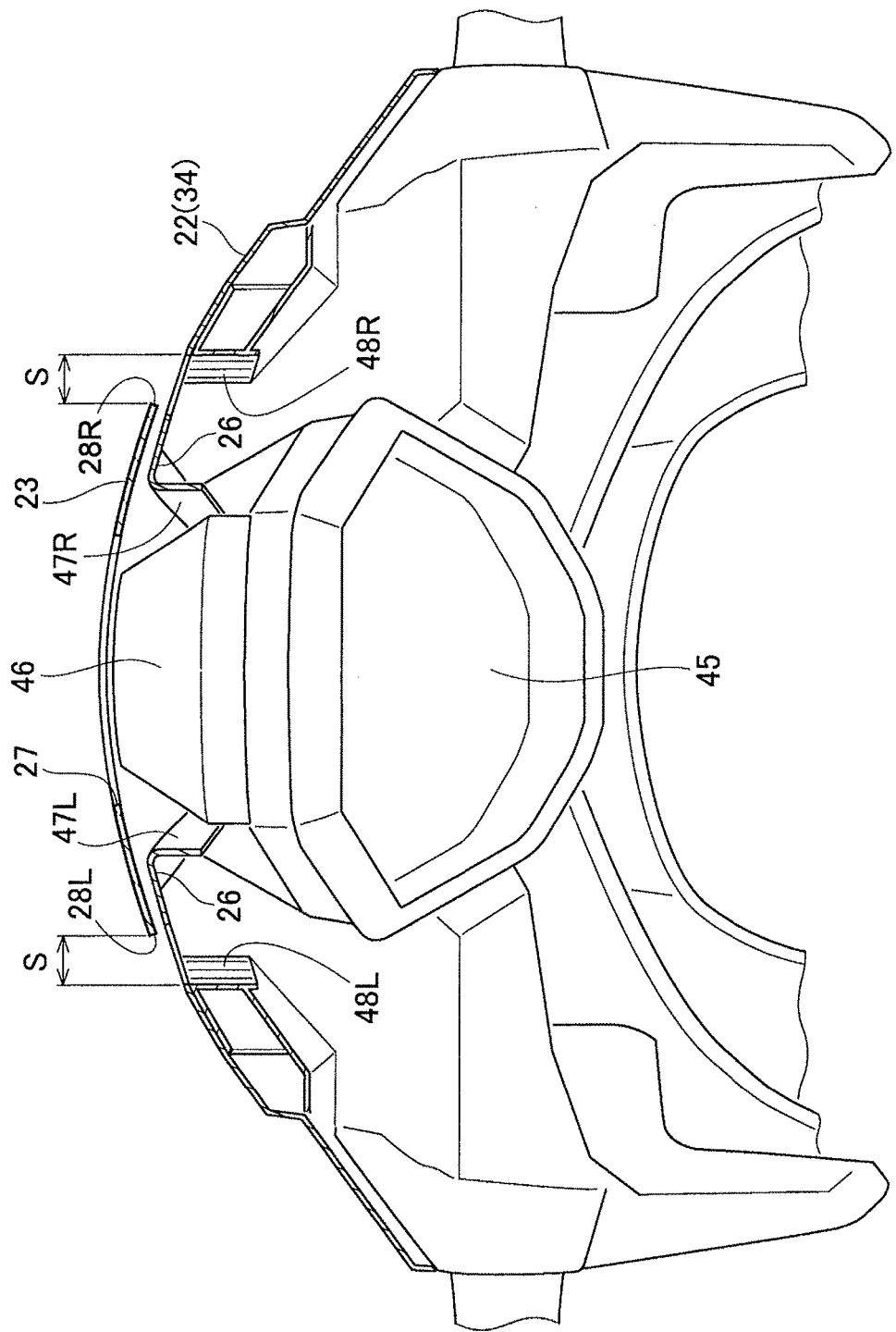
FIG. 4 is a cross-sectional view taken along line 4-4 in FIG. 2.

As shown in FIG. 4, the opening 27 is formed in the windshield 23, and the guide member 46 rising obliquely upward to the rear side of the vehicle is provided in a position rearward of the opening 27 in the vehicle. In this example, a meter case 45 is arranged behind the opening 27 in the vehicle, and an upper end of the guide member 46 is placed on or connected to a front edge of the meter case 45.

Also, a member having an L-shaped cross-sectional surface is employed for the windshield stay 26 for supporting the windshield 23. The windshield stay 26 has one surface being parallel to the windshield 23 and the other surfaces extending in the longitudinal direction of the vehicle. Specifically, the other surfaces are side guide surfaces 47R, 47L, and are arranged to sandwich the guide member 46.

Also, predetermined intervals S, S are kept between the notches 28R, 28L formed in the windshield 23 and the middle members 34. Further, the middle members 34 are provided with inner wall guide surfaces 48R, 48L extending rearward of the vehicle.

Figure 5:
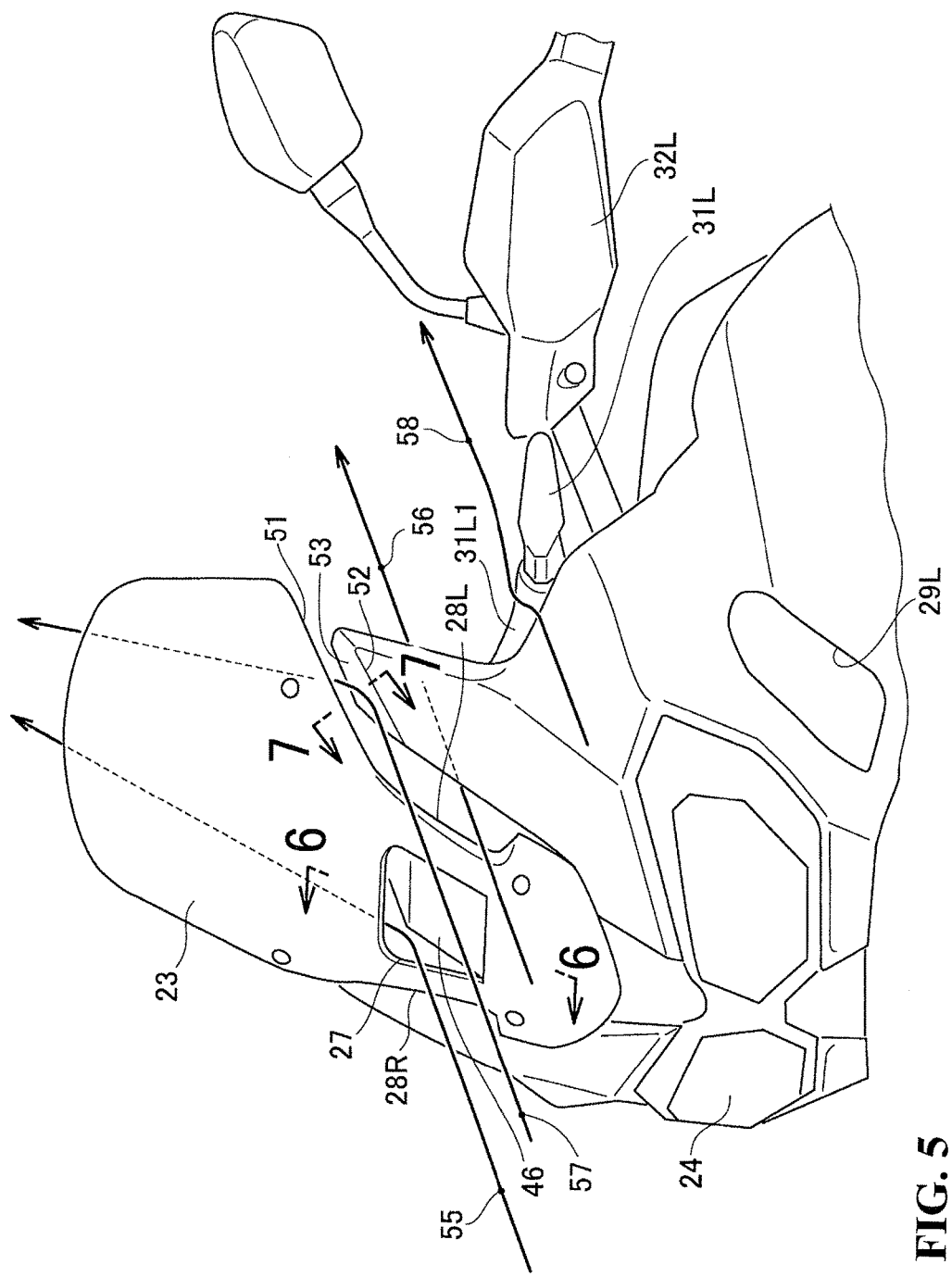
FIG. 5 is a perspective view for explaining a traveling air flow.

As shown in FIG. 5, an upper part of the notch 28L formed in the windshield 23 has an inclined edge 51 inclined so as to be heightened outward in the vehicle width direction. Also, the middle member 34 has an inclined piece 53 in a position behind the inclined edge 51, the inclined piece being bent rearward of the vehicle along a ridge line 52 substantially parallel to the inclined edge 51. The same applies to the notch 28R.

Figure 6:
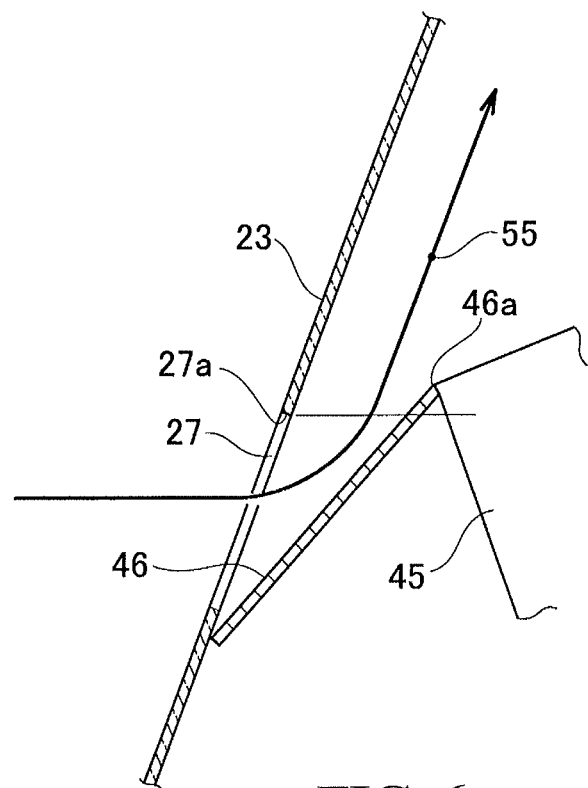
FIG. 6 is a cross-sectional view taken along line 6-6 in FIG. 5.

As shown in FIG. 6, the guide member 46 is provided behind the opening 27, and the first traveling air 55 introduced from the opening 27 is led to flow upward along the back surface of the windshield 23. An upper end 46a of the guide member 46 extends upward beyond the horizontal line passing through an upper edge 27a of the opening 27, and in the front view of the vehicle, the opening 27 overlaps with the guide member 46. That is, the guide member 46 and the opening 27 overlap with each other in the longitudinal direction. Especially, in a height direction of the opening 27, the whole opening overlaps with the guide member 46.

Figure 7:
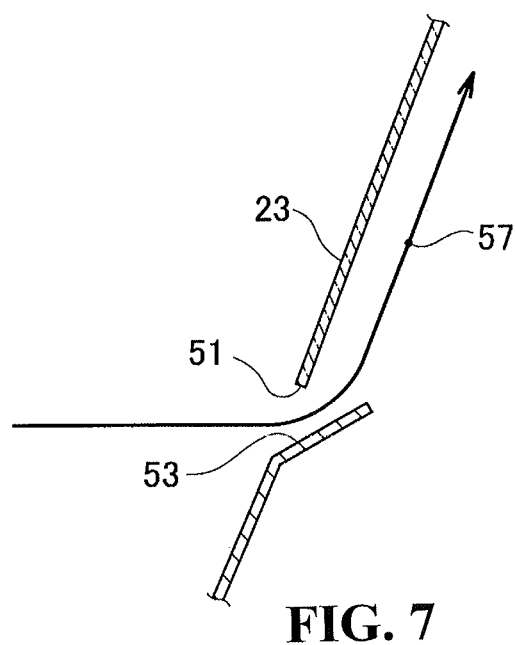
FIG. 7 is a cross-sectional view taken along line 7-7 in FIG. 5.

As shown in FIG. 7, the third traveling air 57 is bent by the inclined piece 53, and is moved upward along the back surface of the windshield 23 and toward the center of the vehicle width.

A flow direction of the first traveling air 55 or the like will be described in detail based on FIG. 5.

The first traveling air 55 as shown in FIG. 5 is passed through the opening 27 formed in the windshield 23. Immediately after that, a direction of the first traveling air 55 is changed by the guide member 46, and is moved upward along the back surface of the windshield 23. Thereby, the vacuum on the back surface of the windshield 23 is corrected.

At this time, the right and left side guide surfaces 47R, 47L as shown in FIG. 4 become effective. That is, after the first traveling air hits against the guide member 46, the first traveling air 55 is suppressed from being dispersed in the vehicle width direction by the side guide surfaces 47R, 47L.

In FIG. 5, the second traveling air 56 is introduced between the notch 28L and the inner wall guide surface (the reference sign 48L in FIG. 4). As shown in FIG. 4, since the inner wall guide surfaces 48R, 48L extend rearward of the vehicle, the second traveling air 56 is directed to flow out to the rear side of the vehicle without entering behind the windshield 23.

In FIG. 5, the third traveling air 57 is moved upward along the back surface of the windshield 23 and toward the center of the vehicle width after the traveling air is bent by the inclined piece 53. The first traveling air 55 with the width limited by the side guide surfaces 47R, 47L shown in FIG. 4 is intended to extend in the vehicle width direction above the windshield stay (the reference sign 26 in FIG. 2); however, in FIG. 5, the extension of the first traveling air 55 is limited by the third traveling air 57 directed to the center of the vehicle width. Therefore, the first traveling air 55 is moved upward along the back surface of the windshield 23, while the extension of the first traveling air 55 is limited, so that especially, the vacuum generated in the vicinity of the upper edge of the windshield 23 is corrected.

In FIG. 2, the knuckle guards 32R, 32L are formed to have a large frontal area, so as to cover hands of an operator gripping the grips.

As shown in FIG. 5, the fourth traveling air 58 first reaches the turn signal lamp 31L or the strut part 31L1, and is dispersed there, and a course of the fourth traveling air is changed to an upward direction. As a result, wind pressure at the knuckle guard 32L is relieved.

It should be noted that in the embodiment, the present invention is applied to a two-wheeled vehicle; however, the present invention is allowed to be applied to a saddle-ride type vehicle provided with three wheels or four wheels.

The present invention is suitable for a two-wheeled vehicle including a windshield and a front cowl.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A saddle-ride type vehicle comprising:
a vehicle body frame having a head pipe;
a front wheel suspension arranged below the head pipe;
a handlebar arranged above the head pipe and configured to steer the front wheel suspension;
a front cowl supported on the vehicle body frame and covering an upper part of the front wheel suspension and the handlebar from a front side of the vehicle;
a windshield supported on the vehicle body frame through a windshield stay and arranged above the front cowl; and
an opening in the windshield opened below a center in a height direction of the windshield and having a bottom edge spaced above a bottom edge of the windshield,
wherein a guide member is configured to allow first traveling air from the opening to flow along a back surface of the windshield, the guide member being arranged behind the opening.

2. The saddle-ride type vehicle according to claim 1, wherein the windshield stay is provided with right and left side guide surfaces for sandwiching the guide member and suppressing dispersion of the first traveling air in the vehicle width direction.

3. The saddle-ride type vehicle according to claim 2, wherein the windshield is obliquely attached in such a manner that an upper part thereof is positioned rearward of the vehicle in comparison with a lower part thereof in a side view of the vehicle, and a mounting angle with respect to a horizontal line is set within a range of 45° to 80°.

4. The saddle-ride type vehicle according to claim 1, wherein the windshield has right and left notches formed on right and left sides of the opening, the notches being formed in such a manner that a lower part of the windshield is recessed inward in the vehicle width direction in comparison with the center in the height direction,
wherein the front cowl is provided with inner wall guide surfaces extending rearward of the vehicle and keeping predetermined intervals from the notches, and
wherein second traveling air is introduced between the notches and the inner wall guide surfaces.

5. The saddle-ride type vehicle according to claim 4, wherein the notches have inclined edges provided above the notches and inclined in order to be heightened outward in the vehicle width direction,
wherein the front cowl has inclined pieces in positions behind the inclined edges, the inclined pieces being bent rearward of the vehicle along ridge lines substantially parallel to the inclined edges, and
wherein third traveling air flowing along the inclined edges is directed to the center of vehicle width by the inclined pieces.

6. The saddle-ride type vehicle according to claim 2, wherein the windshield has right and left notches formed on right and left sides of the opening, the notches being formed in such a manner that a lower part of the windshield is recessed inward in the vehicle width direction in comparison with the center in the height direction,
wherein the front cowl is provided with inner wall guide surfaces extending rearward of the vehicle and keeping predetermined intervals from the notches, and
wherein second traveling air is introduced between the notches and the inner wall guide surfaces.

7. The saddle-ride type vehicle according to claim 6, wherein the notches have inclined edges provided above the notches and inclined in order to be heightened outward in the vehicle width direction,
wherein the front cowl has inclined pieces in positions behind the inclined edges, the inclined pieces being bent rearward of the vehicle along ridge lines substantially parallel to the inclined edges, and wherein third traveling air flowing along the inclined edges is directed to the center of vehicle width by the inclined pieces.

8. The saddle-ride type vehicle according to claim 3, wherein the windshield has right and left notches formed on right and left sides of the opening, the notches being formed in such a manner that a lower part of the windshield is recessed inward in the vehicle width direction in comparison with the center in the height direction,
   wherein the front cowl is provided with inner wall guide surfaces extending rearward of the vehicle and keeping predetermined intervals from the notches, and
   wherein second traveling air is introduced between the notches and the inner wall guide surfaces.

9. The saddle-ride type vehicle according to claim 8, wherein the notches have inclined edges provided above the notches and inclined in order to be heightened outward in the vehicle width direction,
   wherein the front cowl has inclined pieces in positions behind the inclined edges, the inclined pieces being bent rearward of the vehicle along ridge lines substantially parallel to the inclined edges, and
   wherein third traveling air flowing along the inclined edges is directed to the center of vehicle width by the inclined pieces.

10. A saddle-ride type vehicle comprising:
   a vehicle body frame having a head pipe;
   a front wheel suspension arranged below the head pipe;
   a handlebar arranged above the head pipe and configured to steer the front wheel suspension;
   a front cowl supported on the vehicle body frame and covering an upper part of the front wheel suspension and the handlebar from a front side of the vehicle;
   a windshield supported on the vehicle body frame through a windshield stay and arranged above the front cowl;
   an opening opened below a center in a height direction of the windshield and penetrating through a longitudinal direction of the vehicle;
   a guide member configured to allow first traveling air from the opening to flow along a back surface of the windshield, the guide member being arranged behind the opening; and
   right and left notches formed on right and left sides of the opening, each notch having a top edge, a side edge and a bottom edge,
   wherein the front cowl has an upper edge parallel to and spaced from the top edge of each notch, and
   wherein an inclined piece extends from each upper edge of the front cowl and extends behind the windshield.

11. The saddle-ride type vehicle according to claim 10, wherein the windshield stay is provided with right and left side guide surfaces for sandwiching the guide member and suppressing dispersion of the first traveling air in the vehicle width direction.

12. The saddle-ride type vehicle according to claim 11, wherein the windshield is obliquely attached in such a manner that an upper part thereof is positioned rearward of the vehicle in comparison with a lower part thereof in a side view of the vehicle, and a mounting angle with respect to a horizontal line is set within a range of 45° to 80°.

* * * * *